United States Patent [19]

Yasuda et al.

[11] Patent Number: 4,904,842

[45] Date of Patent: Feb. 27, 1990

[54] BLOWHOLE-PIT PREVENTING AGENT AND ARC-WELDING METHOD USING THE SAME

[75] Inventors: Koichi Yasuda; Shosaburo Nakano; Noboru Nishiyama, all of Chiba; Takaro Matsumoto; Katsuaki Nakatsuji, both of Kurashiki; Tadao Komatsu, Kobe; Tadashi Nakajima, Sakai, all of Japan

[73] Assignee: Kawasaki Steel Corporation, Kobe, Japan

[21] Appl. No.: 111,870

[22] Filed: Oct. 21, 1987

[30] Foreign Application Priority Data

Oct. 24, 1986 [JP] Japan .................................. 61-254433
Mar. 23, 1987 [JP] Japan .................................. 62-68574

[51] Int. Cl.⁴ ................................................ B23K 9/00
[52] U.S. Cl. .................................... 219/137 R; 219/92

[58] Field of Search ...................... 219/137 R, 118, 92, 219/125.1, 137 WM; 420/470, 472, 473; 106/14.44

[56] References Cited

U.S. PATENT DOCUMENTS 3,102,190  4/1964  Chapleur .
4,110,117  8/1978  McLeod ........................... 106/14.44
4,444,353  4/1984  McMurray .
4,701,302  10/1987 Dommer et al. .................... 420/470

Primary Examiner—Leo P. Picard
Assistant Examiner—L. Donovan
Attorney, Agent, or Firm—Balogh, Osann, Kramer, Dvorak, Genova & Traub

[57] ABSTRACT

In lap joint welding of galvanized sheets, the occurrence of blowhole and pit is prevented by applying a blowhole-pit preventing agent comprising a phosphorus compound as an effective ingredient prior to the arc-welding.

5 Claims, 4 Drawing Sheets

FIG_1
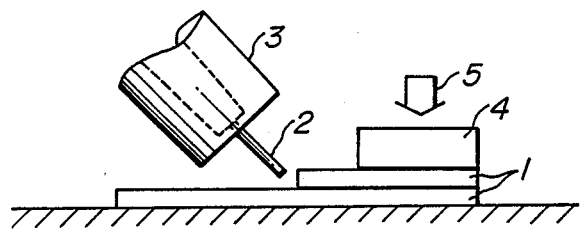
FIG_4
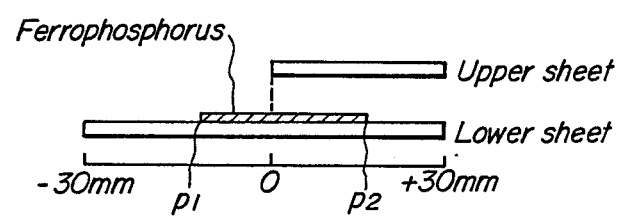

FIG_2
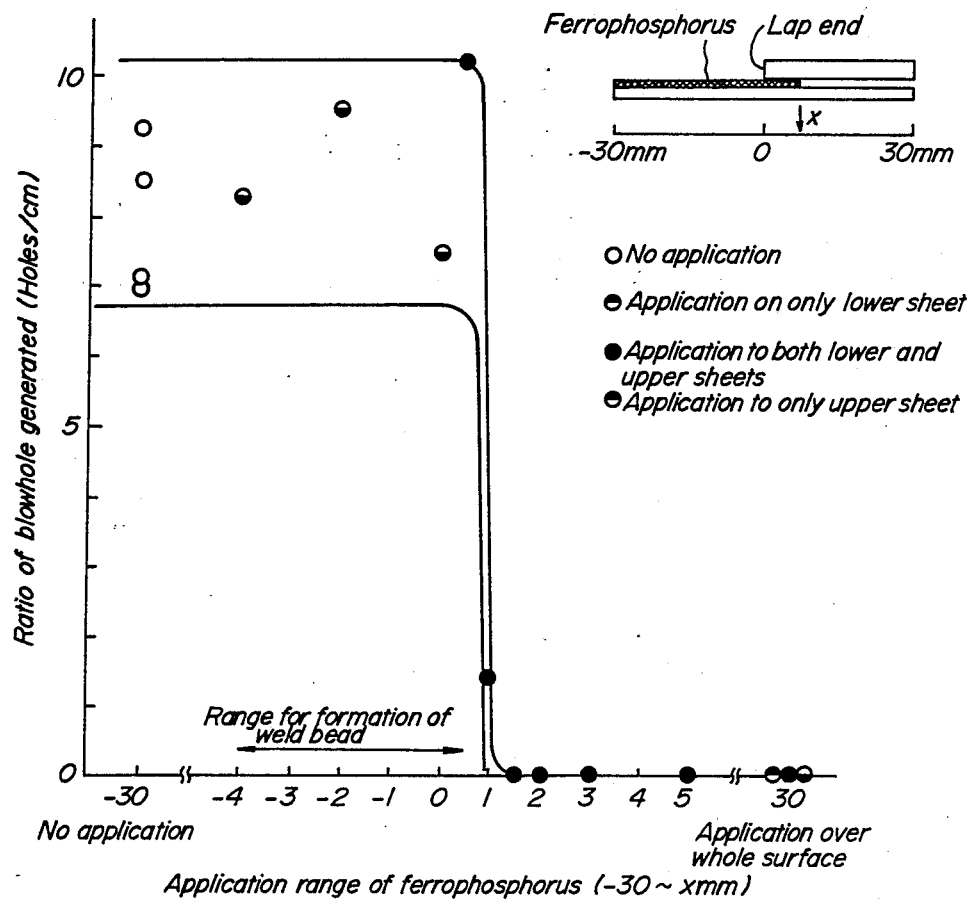

FIG_5a
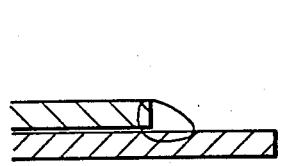
FIG_5b
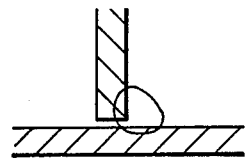
FIG_5c
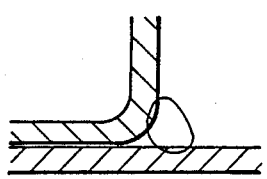
FIG_5d
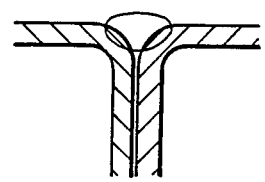
FIG_5e
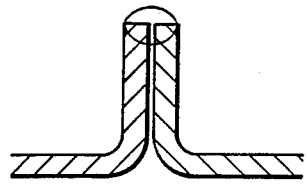
FIG_5f

BLOWHOLE-PIT PREVENTING AGENT AND ARC-WELDING METHOD USING THE SAME

BACKGROUND OF THE INVENTION

1. Field of the Invention

This invention relates to a blowhole-pit preventing agent and an arc-welding method using the same, and more particularly to an effective means for preventing the occurrence of blowhole and pit as a serious defect in the arc-welding of galvanized sheets.

2. Relates Art Statement

In general, surface treated materials obtained by applying zinc or zinc alloy or a composition containing them to a surface of a metallic substrate to form a plated film or coated film are called as a galvanized sheet inclusive of zinc-plated steel sheet. When the treated surfaces of the galvanized sheets are lapped one upon the other to form a lap joint by welding, zinc or the like is vaporized by a welding heat to produce a high vapor pressure of zinc in the joint face, whereby blowholes or pits are frequently produced in weld bead. This becomes a serious problem up to the present, and consequently it is unable to apply the arc welded joint of the galvanized sheet to portions requiring severer quality of welded joint, for example, high-strength members and the like.

Prior to the welding, zinc or the like in the vicinity of the welded joint portion was previously removed by a mechanical means, or by vaporization through a gas burner or an ahead torch, or by a chemical means such as use of a remover or the like. In this case, not only the number of steps undesirably increases but also zinc or the like existent in the portion other than the welded portion is unnecessarily removed or the portion near to the welded portion is damaged to undesirably injure the rust preventing ability and appearance of base metal.

Since the remover contains a large amount of organic solvent, acid, alkali or the like, the use of such a remover unfavorably damages the working environment and safety.

SUMMARY OF THE INVENTION

It is, therefore, an object of the invention to solve the problems on the occurrence of blowhole and pit in the arc-welding of the galvanized sheet without causing the aforementioned drawbacks of the conventional techniques.

It is another object of the invention to provide a blowhole pit preventing agent which can effectively suppress the occurrence of blowhole and pit even when zinc or the like is existent in a portion to be welded and an arc-welding method of a galvanized sheet by using the blowhole-pit preventing agent which can be carried out under a high welding efficiency.

Moreover, the term "lap joint welding" used herein means to include fillet welding, T-shape or cruciform joint welding, flare welding, edge welding, spot welding, seam welding and the like as shown in FIG. 5.

According to a first aspect of the invention, there is the provision of a blowhole-pit preventing agent useful for arc-welding of galvanized sheets, comprising a phosphorus compound as an effective ingredient.

According to a second aspect of the invention, there is the provision of an arc-welding method of a galvanized sheet, which comprises applying a blowhole-pit preventing agent as defined above to a portion of a galvanized sheet to be welded and then performing an arc-welding.

BRIEF DESCRIPTION OF THE DRAWINGS

The invention will be described with reference to the accompanying drawings, wherein:

FIG. 1 is a schematic view illustrating an arc-welding for lap joint;

FIGS. 2 and 3 are graphs showing a relation between an application range of ferrophosphorus and a ratio of blowhole generated, respectively;

FIG. 4 is a schematic view defining an application position range of ferrophosphorus; and FIGS. 5a to 5f are partial section views of various embodiments of the welded joint developing the effect of the invention.

DESCRIPTION OF THE PREFERRED EMBODIMENTS

Figure 3:
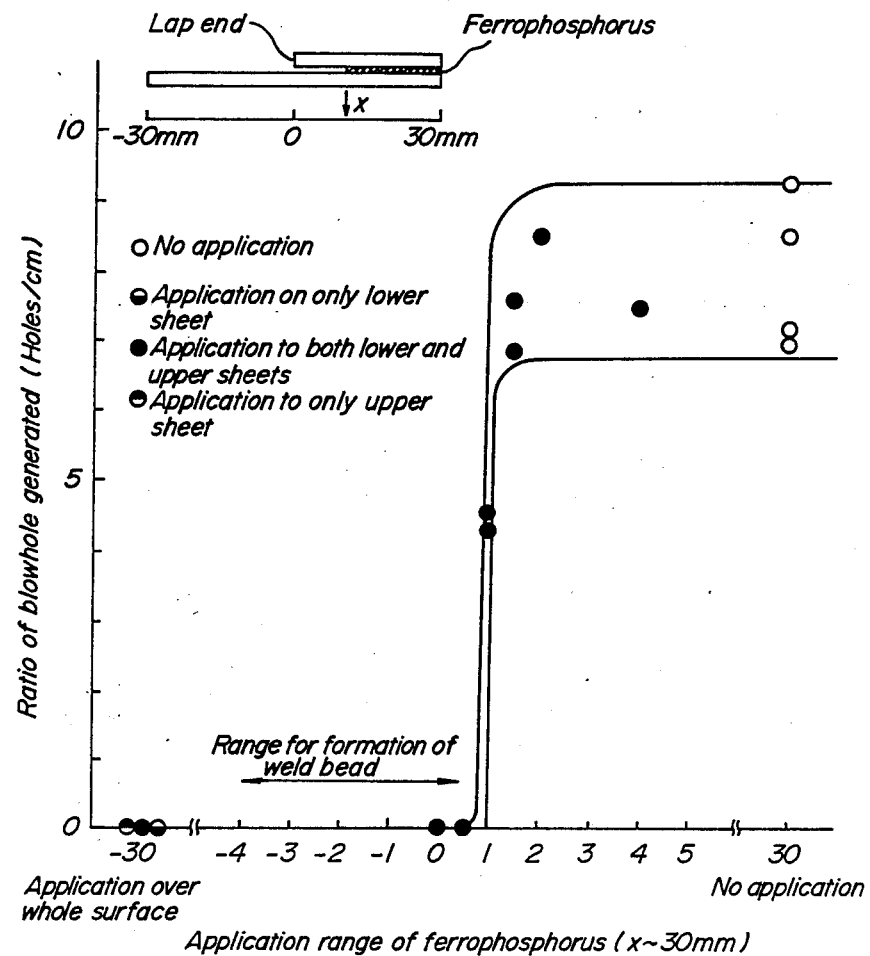

The inventors have made various experiments using elemental phosphorus and phosphorus compounds as a blowhole-pit preventing agent and found that at least one phosphorus compound of the general formula MxPy (M is an element selected from Fe, Ni, Cu, Cr, Mo, Mn, Si and Al, and x and y are an integer, respectively) such as ferrophosphorus, nickel phosphoride, copper phosphoride, chromium phosphoride, molybdenum phosphoride, manganese phosphoride, silicon phosphoride and aluminum phosphoride is effective for preventing the occurrence of blowhole and pit. Among these phosphorus compounds, the use of ferrophosphorus is preferable in view of economic reasons, safety in atmosphere and the like. Moreover, the ferrophosphorus is represented by at least one chemical formulae of FeP, $Fe_2P$, $Fe_3P$ and $FeP_2$ and has a phosphorus content of 15~55% by weight.

According to the invention, the blowhole-pit preventing agent consists of 5~70% by weight of a ferrophosphorus, 0.1~20% by weight of at least one additive and the balance being a solvent.

When the prevention agent according to the invention is supplied to a weld line on the galvanized sheet prior to the welding, it is spreaded in form of powder, or a suspension is sprayed by means of a spray gun or adhered to the weld line with a brush. If necessary, a proper additive such as water, solvent, adhesive, dispersant or the like may be added to the prevention agent. As the adhesive, a substance forming inorganic continuous coating in the drying, such as ethyl silicate, organic titanate or the like is particularly effective because there is produced no gas from this substance itself.

According to the invention, the blowhole-pit preventing agent comprising the phosphorus compound as an effective ingredient is adhered to a region of at least one surface of base metal adjacent to a position of weld bead to be formed, i.e. surfaces of base metals to be lapped with each other adjacent to the weld bead or a surface forming voids capable of oppressing the weld bead with a high pressure vapor of zinc vaporized by a welding heat in the formation of weld bead, prior to the arc-welding.

In the arc-welding of the galvanized sheet, zinc existent in the surface layer of base metal to be welded has a melting point of about 419.5° C. and a boiling point of about 906° C., which are fairly lower than those of carbon steel, so that when the base metal is heated to a temperature above the melting point of zinc by the welding heat, zinc in the heated region is fused and finally vaporized into a vapor.

In the lap joint welding, however, the resulting zinc vapor can not easily escape from gaps in the joint face to the outside, so that when the zinc vapor is discharged through molten pool formed by welding to the outside with the increase of vapor pressure, a part of zinc bubbles is caught in a weld metal or its surface neighbor in accordance with timing between the discharge of zinc vapor and the solidification of molten pool, resulting in the occurrence of blowhole and pit. The inventors have made studies with respect to the mechanism of generating the blowhole and pit and found out that when the phosphorus compound is previously adhered to the region forming a source for the formation of high pressure zinc vapor in gaps as mentioned above prior to the welding, the occurrence of blowhole or pit is prevented at the subsequent welding step.

According to the invention, the phosphorus compound reacts with zinc and molten iron under the welding heat to form a three-component compound of phosphorus-zinc-iron having melting and boiling points higher than those of zinc, so that the occurrence of blowhole and pit resulted from the vaporization of zinc can be prevented by the above compound.

When ferrophosphorus is used as a phosphorus compound, if the P content is less than 15% by weight, the force for the formation of three-component compound is low and the effect of preventing the occurrence of blowhole and pit is weak, while if it exceeds 55% by weight, it is difficult to synthesize the ferrophosphorus. Therefore, the ferrophosphorus having a P content of 15~55% by weight is used as the phosphorus compound.

Then, the adequate application position of ferrophosphorus was examined when both-side zinc hot dipped steel sheets of 2.6 mm in thickness (weight of hot dipped zinc: 45 g/m$^2$/surface) to be welded are subjected to a lap joint welding using a commercially available ferrophosphorus having a P content of 20~28% by weight as shown in FIG. 1. In FIG. 1, numeral 1 is a zinc hot dipped steel sheet, numeral 2 a welding wire, numeral 3 a welding torch, numeral 4 a pressure plate and numeral 5 a pressing force.

The measured results are shown in FIGS. 2 and 3. As seen from FIGS. 2 and 3, when the ferrophosphorus is applied to at least one of the lapped surfaces at a position corresponding to a width of at least 0.5~1.5 mm measured from the lap end, the ratio of blowhole generated rapidly reduces. As a result of observations in the section of welded joint after the formation of weld bead, it has been found that the weld bead is formed with melting of the lapped surface up to 0.5 mm from the lap end.

That is, the effective application position of the ferrophosphorus is that region of at least one of the lapped surfaces which has a width of not less than 1.0 mm adjacent to the weld bead. If the application region does not satisfy the above requirement, the ratio of blowhole generated rapidly increases and the object of the invention can not be achieved sufficiently. In this experiment, the application amount of ferrophosphorus was 60 g/m$^2$.

Next, the effective and adequate amount of phosphorus compound applied was examined as follows.

That is, the ratio of blowhole generated was measured by changing the amount of ferrophosphorus applied to the one side of the lapped surfaces including the aforementioned effective application region. As a result, when the application amount is less than 10 g/m$^2$, the blowholes occur, while when it exceeds 1,000 g/m$^2$, the effect of reducing the ratio of blowhole generated is observed but the weld bead becomes humping to undesirably damage the bead appearance.

Therefore, the effective application amount of the phosphorus compound is restricted to a range of 10~1,000 g/m$^2$.

Moreover, it is confirmed from the experiments that it is better to make the application amount of the phosphorus compound larger within the above range as the weight of hot dipped zinc becomes larger.

As previously mentioned, the phosphorus compound is spreaded in form of powder, or sprayed through a spray gun or applied through a brush in form of suspension prior to the welding. In any case, there is caused no special problem.

Moreover, the phosphorus compound may previously be adhered to the surface of the zinc coating, or chemically or physically included in the zinc coating in the production of surface treated steel sheets.

The phosphorus compound may be selected by taking the economic reasons and safety into account because the action of reducing blowholes by the ferrophosphorus can be achieved even by the other phosphorus compounds.

The following examples are given in the illustration of the invention and are not intended as limitations thereof.

EXAMPLE 1

A lap joint welding as shown in FIG. 1 was carried out with respect to both-side zinc hot dipped steel sheets of 2.6 mm in thickness (weight of hot dipped zinc: 45 g/m$^2$/surface) using a suspension of a phosphorus compound having the following composition:

| | |
|---|---|
| ferrophosphorus powder (P content: 20% by weight, average particle size $\leq 3$ μm) | 53% |
| 1,1,1-trichloroethane | 46% |
| titanate binder | 1% |

The suspension was sprayed onto the surface of the lower steel sheet in an amount of 100 g/m$^2$ as a flon series aerosol. On the other hand, the pulsed MAG welding was carried out by using a commercially available wire for MAG welding (JIS-YGW 16, wire diameter: 1.2 mm) and a shielding gas of Ar+20% CO$_2$ under welding conditions of 220 A, 23 V and 120 cm/min.

The state of blowhole and pit generated was observed by an X-ray test of weld zone.

The measured results are shown in the following Table 1, wherein the application position is represented by coordinates p1~p2 on number line of FIG. 4.

Moreover, the weld bead was formed over a range of $-4.0 \times +0.5$ mm.

TABLE 1

| | Application position (p1~p2) | Application width (mm) | Ratio of blowhole and pit generated (holes/cm) |
|---|---|---|---|
| Comparative Example | no application | 0 | 8.3 |
| | −30.0(mm)~0.0(mm) | 30 | 9.2 |
| | 2.0~30.0 | 28 | 8.1 |
| | 1.5~30.0 | 28.5 | 5.7 |
| | 1.0~30.0 | 29 | 3.2 |

TABLE 1-continued

|  | Application position (p1~p2) | Application width (mm) | Ratio of blowhole and pit generated (holes/cm) |
|---|---|---|---|
| Example | −30.0~30.0 | 60 | 0.0 |
|  | −5.0~5.0 | 10 | 0.0 |
|  | −1.5~1.5 | 3 | 0.0 |
|  | 0.0~1.5 | 1.5 | 0.0 |
|  | 0.5~1.5 | 1 | 0.0 |
|  | 0.5~10.0 | 9.5 | 0.0 |
|  | 0.5~20.0 | 19.5 | 0.0 |
|  | 0.5~30.0 | 29.5 | 0.0 |

EXAMPLE 2

A lap joint welding as shown in FIG. 1 was carried out with respect to both-side zinc alloy hot dipped steel sheet of 2.2 mm in thickness (weight of hot dipped zinc: 75 g/m$^2$/surface) using a suspension of a phosphorous compound having the following composition:

| ferrophosphorus powder (P content: 28% by weight, average particle size: 2 μm) | 42% |
|---|---|
| isopropyl alcohol | 56% |
| ethyl silicate binder | 2% |

The suspension was sprayed onto only the lapped surface of the upper steel sheet over a width of 10 mm extending from the lap end by changing the application amount as a flon series aerosol. On the other hand, the pulsed CO$_2$ gas shielded arc welding was carried out by using a commercially available wire for CO$_2$ gas shielded arc welding (JIS-YGW 12, wire diameter: 1.2 mm) under welding conditions of 200 A, 22 V and 100 cm/min.

The measured results are shown in the following Table 2.

TABLE 2

|  | Application amount of ferrophosphor (g/m$^2$) | Ratio of blowhole and pit generated (holes/cm) | Bead appearance* |
|---|---|---|---|
| Comparative Example | 0 | 9.2 | X |
|  | 2 | 9.8 | Δ |
|  | 5 | 4.7 | O |
|  | 8 | 1.3 | O |
| Example | 10 | 0.0 | O |
|  | 40 | 0.0 | O |
|  | 80 | 0.0 | O |
|  | 120 | 0.0 | O |
|  | 200 | 0.0 | O |
|  | 500 | 0.0 | O |
|  | 1,000 | 0.0 | O |
| Comparative Example | 1,500 | 0.0 | ⊖ |
|  | 2,000 | 0.0 | ⊖ |

*Bead appearance
X: poor (due to occurrence of pit)
Δ: slightly poor (due to occurrence of pit)
⊖: slightly poor (due to hamping bead)
O: good As mentioned above, according to the invention, the occurrence of blowhole and pit as a serious defect of welded joints can completely be prevented by applying a proper amount of the phosphorus compound to a given position of a galvanized sheet (see FIG. 5) prior to the lap joint welding. Therefore, the invention not only develops a great usefulness in the arc-welding of zinc plated sheets, steel sheets treated with a zinc rich primer, and the like, but also is applicable to industrial fields giving up the use of zinc treated steel sheets due to the fear of generating blowhole and so on in the weld metal.

What is claimed is:

1. A blowhole-pit preventing agent for arc-welding of (1) used as a coating on galvanized sheets subjected to arc welding consisting of 5-70% by weight of at least one ferrophosphorus selected from the group consisting of Fe$_2$P, FeP, Fe$_3$P and FeP$_2$ and having a phosphorus content of 15-55% by weight, 0.1-20% by weight of an additive and the balance being a solvent.

2. The blowhole-pit preventing agent according to claim 1, wherein said phosphorus content is 20~28% by weight.

3. A method for lap joint arc-welding a galvanized sheet, which comprises applying a blowhole-pit preventing agent consisting of 5-70% by weight of at least one ferrophosphorus selected from the group consisting of Fe(2)P, FeP, Fe(3)P and FeP(2) and having a phosphorus content of 15-55% by weight, 0.1-20% by weight of an additive and the balance being a solvent to at least one of the lapped surfaces to be welded and then performing an arc-welding.

4. The method according to claim 3, wherein said blowhole-pit preventing agent is applied over a region of at least 1 mm width adjacent to a position of weld bead to be formed.

5. The method according to claim 4, wherein said phosphorus compound of the blowhole-pit preventing agent is applied in an amount of 10~1,000 g/m$^2$.

* * * * *